United States Patent
Jinkins et al.

(10) Patent No.: US 8,909,471 B1
(45) Date of Patent: Dec. 9, 2014

(54) VOTING SYSTEM AND METHOD USING DOPPLER AIDED NAVIGATION

(75) Inventors: Richard D. Jinkins, Rewey, WI (US); Richard M. Rademaker, Rijswijk ZH (NL); Daniel L. Woodell, Cedar Rapids, IA (US); James H. Doty, Cedar Rapids, IA (US); Keith L. Kerley, Satellite Beach, FL (US); James Alva Young, Jr., Cedar Rapids, IA (US); Shih-Yih Young, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 303 days.

(21) Appl. No.: 13/250,307

(22) Filed: Sep. 30, 2011

(51) Int. Cl.
    *G01S 5/00* (2006.01)
(52) U.S. Cl.
    USPC ...... 701/468; 701/1; 701/4; 701/41; 701/120; 701/470; 342/350; 342/352; 342/357.2; 342/357.24
(58) Field of Classification Search
    CPC .................................. G01S 5/00; G01S 19/00
    USPC .................. 701/1, 4, 41, 120, 468, 470, 472; 342/350, 352, 357.2, 357.22, 357.23, 342/357.24
    See application file for complete search history.

(56) References Cited

U.S. PATENT DOCUMENTS

| | | | |
|---|---|---|---|
| 2,849,184 A | 8/1958 | Arden et al. | |
| 5,045,855 A | 9/1991 | Moreira | |
| 5,166,688 A | 11/1992 | Moreira | |
| 5,202,690 A | 4/1993 | Frederick | |
| 6,205,400 B1 * | 3/2001 | Lin | 701/472 |
| 6,427,122 B1 * | 7/2002 | Lin | 701/472 |
| 6,441,773 B1 | 8/2002 | Kelly et al. | |
| 6,448,922 B1 | 9/2002 | Kelly | |
| 6,516,272 B2 * | 2/2003 | Lin | 701/472 |
| 6,516,283 B2 * | 2/2003 | McCall et al. | 702/141 |
| 6,650,275 B1 | 11/2003 | Kelly et al. | |
| 6,977,608 B1 * | 12/2005 | Anderson et al. | 342/26 B |
| 7,109,912 B1 | 9/2006 | Paramore et al. | |
| 7,109,913 B1 | 9/2006 | Paramore et al. | |
| 7,161,525 B1 | 1/2007 | Finley et al. | |
| 7,242,343 B1 | 7/2007 | Woodell | |
| 7,292,178 B1 | 11/2007 | Woodell et al. | |
| 7,307,576 B1 | 12/2007 | Koenigs | |
| 7,307,577 B1 * | 12/2007 | Kronfeld et al. | 342/26 B |

(Continued)

OTHER PUBLICATIONS

G2000, Garmin, printed from website https://buy.garmin.com/shop/shop.do?cID=153&pID=97668 on Jun. 28, 2011, 2 pages.

(Continued)

*Primary Examiner* — John R Olszewski
*Assistant Examiner* — Truc M Do
(74) *Attorney, Agent, or Firm* — Angel N. Gerdzhikov; Donna P. Suchy; Daniel M. Barbieri

(57) ABSTRACT

A position determining voting system that uses Doppler information from an on-board weather radar to improve the system's accuracy and/or fault tolerance includes a comparison function and an error integration function. The comparison function is used to monitor the independent position sources for correct operation, comparing and identifying a position source that should not be used based on its relative error compared with the other position sources and their characteristics. The integration function provides corrections to relative position sources by integrating the data from multiple absolute position sources when they are mutually consistent.

20 Claims, 4 Drawing Sheets

(56) References Cited

U.S. PATENT DOCUMENTS

| | | | |
|---|---|---|---|
| 7,372,394 B1 | 5/2008 | Woodell et al. | |
| 7,379,014 B1 | 5/2008 | Woodell et al. | |
| 7,417,578 B1 | 8/2008 | Woodell et al. | |
| 7,417,579 B1 * | 8/2008 | Woodell | 342/26 B |
| 7,486,220 B1 | 2/2009 | Kronfeld et al. | |
| 7,492,304 B1 | 2/2009 | Woodell et al. | |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,765 B1 | 5/2009 | Woodell et al. | |
| 7,541,970 B1 | 6/2009 | Godfrey et al. | |
| 7,541,971 B1 | 6/2009 | Woodell et al. | |
| 7,557,735 B1 | 7/2009 | Woodell et al. | |
| 7,576,680 B1 | 8/2009 | Woodell | |
| 7,633,428 B1 | 12/2009 | McCusker et al. | |
| 7,633,430 B1 | 12/2009 | Wichgers et al. | |
| 7,693,621 B1 * | 4/2010 | Chamas | 701/16 |
| 7,696,921 B1 | 4/2010 | Finley et al. | |
| 7,714,767 B1 | 5/2010 | Kronfeld et al. | |
| 7,733,264 B1 | 6/2010 | Woodell et al. | |
| 7,859,448 B1 | 12/2010 | Woodell et al. | |
| 7,859,449 B1 | 12/2010 | Woodell et al. | |
| 7,868,811 B1 | 1/2011 | Woodell et al. | |
| 7,872,594 B1 | 1/2011 | Vesel | |
| 7,889,117 B1 | 2/2011 | Woodell et al. | |
| 7,889,118 B1 | 2/2011 | Finley et al. | |
| 7,965,225 B1 | 6/2011 | Dickerson et al. | |
| 8,068,984 B2 * | 11/2011 | Smith et al. | 701/472 |
| 8,072,368 B1 | 12/2011 | Woodell | |
| 8,077,078 B1 | 12/2011 | Woodell | |
| 8,140,223 B2 * | 3/2012 | Whitehead et al. | 701/41 |
| 8,159,464 B1 | 4/2012 | Gribble et al. | |
| 8,232,917 B2 * | 7/2012 | Scherzinger et al. | 342/357.24 |
| 8,296,065 B2 * | 10/2012 | Haynie et al. | 701/505 |
| 8,583,315 B2 * | 11/2013 | Whitehead et al. | 701/31.4 |
| 8,594,879 B2 * | 11/2013 | Roberge et al. | 701/23 |
| 8,634,993 B2 * | 1/2014 | McClure et al. | 701/50 |
| 8,639,416 B2 * | 1/2014 | Jones et al. | 701/41 |
| 8,643,533 B1 | 2/2014 | Woodell et al. | |
| 2002/0111717 A1 * | 8/2002 | Scherzinger et al. | 701/1 |
| 2002/0116125 A1 * | 8/2002 | Lin | 701/214 |
| 2002/0116126 A1 * | 8/2002 | Lin | 701/214 |
| 2004/0072575 A1 * | 4/2004 | Young et al. | 455/456.1 |
| 2006/0244636 A1 | 11/2006 | Rye et al. | |
| 2007/0032951 A1 * | 2/2007 | Tanenhaus et al. | 701/220 |
| 2007/0279253 A1 * | 12/2007 | Priest | 340/963 |
| 2009/0164067 A1 * | 6/2009 | Whitehead et al. | 701/41 |
| 2010/0312428 A1 * | 12/2010 | Roberge et al. | 701/23 |
| 2010/0312461 A1 * | 12/2010 | Haynie et al. | 701/117 |
| 2011/0054729 A1 * | 3/2011 | Whitehead et al. | 701/29 |
| 2012/0053831 A1 * | 3/2012 | Halder | 701/439 |
| 2012/0150426 A1 * | 6/2012 | Conway | 701/120 |
| 2012/0174445 A1 * | 7/2012 | Jones et al. | 37/197 |
| 2012/0215410 A1 * | 8/2012 | McClure et al. | 701/50 |

OTHER PUBLICATIONS

G3000, Garmin, printed from website https://buy.garmin.com/shop/shop.do?cID=153&pID=66916 on Jun. 28, 2011, 2 pages.

G5000, Garmin, printed from website https://buy.garmin.com/shop/shop.do?cID=153&pID=90821&ra=true on Apr. 20, 2011, 2 pages.

Office Action for U.S. Appl. No. 13/224,992, mail date Feb. 28, 2013, 10 pages.

Office Action for U.S. Appl. No. 13/743,182, mail date Apr. 8, 2013, 10 pages.

U.S. Appl. No. 13/224,992, filed Sep. 2, 2011, Hufnagel et al.

U.S. Appl. No. 13/250,798, filed Sep. 30, 2011, Jinkins et al.

Office Action on U.S. Appl. No. 13/250,798 Dated Apr. 23, 2014, 15 pages.

Final Office Action on U.S. Appl. No. 13/250,798 Dated Sep. 4, 2014, 22 pages.

\* cited by examiner

VOTING SYSTEM AND METHOD USING DOPPLER AIDED NAVIGATION

CROSS REFERENCE TO RELATED APPLICATIONS

The present application is related to U.S. application Ser. No. 13/250,798 entitled "System and Method for Doppler Aided Navigation Using Weather Radar", filed by Jinkins et al, on an even date herewith, assigned to the Assignee of the present application and incorporated by reference in its entirety.

BACKGROUND

The present disclosure relates generally to the field of navigation. More specifically, the present disclosure relates to a system for and method of navigation using weather radar.

Required navigation performance (RNP) specifications for Federal Aviation Administration (FAA) approach procedures require accurate navigation performance. Conventional aircraft often rely on Global Positioning Systems (GPS) and Inertial Navigation System (INS) to estimate the aircraft's position (latitude, longitude and altitude) and other flight parameters (e.g., track angle, ground speed, pitch, roll, heading, angular rates and accelerations). In addition, the RNP specifications require navigation accuracy to be maintained after a failure or loss of any signal on the aircraft or the loss of the GPS signal in space. This generally requires redundancy for navigation sources in case of a GPS or other sensor/system outage or failure. This includes undetected hazardously misleading failures in any of the sensor systems or in any satellite. In general, conventional systems rely upon an INS and accompanying sensors to provide redundant parameters for navigation. The INS itself is expensive. Sensors for an INS generally must be avionic grade and can also add significant cost. An INS system and associated sensors also increase the weight of the aircraft. Additionally, radio navigation sources such as Global Navigation Satellite Systems (GNSS) including GPS, Galileo, GLONASS, and other proposed systems such as COMPASS, are absolute navigation systems. The accuracy of absolute radio navigation sources depends on factors such as satellite geometry, signal propagation effects, noise and transmission errors. In general these systems provide an absolute position reference with a bounded and predictable level of error and do not drift over time. Relative navigation systems such as INS and Doppler Aided Navigation Systems (DANS) calculate position by integrating acceleration and/or velocity and adding the estimated change in position to an initial position to estimate current position. In these relative navigation systems, sensor errors will cause drift in position error gradually increasing in error over time. Therefore relative positioning systems must be corrected periodically using navigation correction information derived from an absolute position reference like GPS, to ensure that the system position estimate remains inside the specified RNP accuracy limits.

Many current avionics installations utilize a system consisting of two subsystems (left pilot side and right copilot side), each subsystem including an Inertial Reference System (IRS), a GPS receiver and a Flight Management System (FMS). The FMS on each side utilizes the on-side GPS data, when marked valid and accurate, to calculate the position offset of the IRS. If GPS data is lost, the FMS will continue to output a position estimate based on the current output of the IRS and the position offset calculated at the time of last good GPS data. This approach has two significant limitations. The first limitation is that if the GPS receiver has a failure that causes it to produces an erroneous output, the FMS will output an erroneous position and calculate an erroneous position offset estimate for the IRS. Although cross monitoring techniques may be used to detect when the left and right FMS position estimates diverge, the system does not provide an automatic method for determining which FMS solution is erroneous and which is accurate. The second limitation is that the FMS calculates only a position offset in the IRS solution, no sensor error parameters are updated in the IRS so the rate of drift is not reduced. After a long flight the IRS may have a significant rate of position drift. This reduces the time that the system can accurately "coast" after loss of GPS.

Both of the above limitations can impact safety of RNP navigation to tight limits such as RNP 0.1 nautical miles. When operating an aircraft within tight RNP limits there is little time for a pilot to determine which GPS system has failed and which system is accurate after a position miscompare is identified, and high rates of IRS drift greatly limit the time the aircraft can maintain the RNP limits after loss of GPS.

Therefore, there is a need for a system and method that can quickly and automatically identify and isolate GPS receiver failures and which provides high-integrity feedback to the inertial system to allow sensor errors to be calibrated to enhance coasting performance after loss of GPS.

SUMMARY

An exemplary embodiment of the disclosure relates to a method of navigation for an aircraft. The method includes utilizing data from at least two absolute navigation systems and at least one relative navigation system to generate high integrity corrections to the relative navigation system outputs and utilizing the corrections to produce corrected relative navigation data improving the accuracy of the relative navigation system. The method also includes comparing data from at least two absolute navigation systems with corrected relative navigation data in such a way to detect and isolate erroneous data from any one of the navigation systems, and produce a high integrity navigation solution.

Another exemplary embodiment of the disclosure relates to a navigation system using at least two absolute navigation systems and a relative navigation system. The navigation system includes an integration function that generates high integrity corrections to the errors in the relative navigation system output to produce corrected relative navigation data improving the accuracy of the relative navigation system. The navigation system also includes at least one comparator function that compares the outputs of the two absolute navigation systems with the corrected relative navigation data and generates a high integrity navigation solution.

Another exemplary embodiment of the disclosure relates to an apparatus including means for processing output data from at least two absolute navigation systems and at least one relative navigation system and generating corrections for the errors in the relative navigation system output as well as generating a high integrity navigation solution.

Another exemplary embodiment of the disclosure relates to a method of estimating position for an aircraft. The method includes receiving data from multiple absolute position sources and receiving data from at least one relative position source. The method further includes monitoring the data from the multiple absolute position sources and the relative position source to determine qualified position sources. The method further includes comparing the data from the qualified position sources against each other to identify qualified position sources that produce position data that are not consistent with the other qualified position sources. The method further includes integrating the data from the consistent absolute position sources to correct errors in the relative position source.

Another exemplary embodiment of the disclosure relates to a high integrity navigation system. The high integrity navigation system includes at least two absolute navigation systems, at least one relative navigation system, at least one integration function unit, and at least one comparator function unit. The integration function unit provides correction to long-term drift of the relative navigation system, and the comparator unit generates a high integrity navigation solution.

Another exemplary embodiment of the disclosure relates to a high integrity navigation system for use in aircraft and other vehicles requiring enhanced navigation performance and integrity. The high integrity navigation system includes an input for receiving information from two absolute navigation systems and a relative navigation system. The high integrity navigation system further includes a voting means for combining an output of the relative navigation system with an output of the two absolute navigation systems to provide high integrity corrections for the relative navigation system so that the relative navigation system provides an accurate, high-integrity navigation data output.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below, wherein like numerals denote like elements.

DETAILED DESCRIPTION

Figure 1:
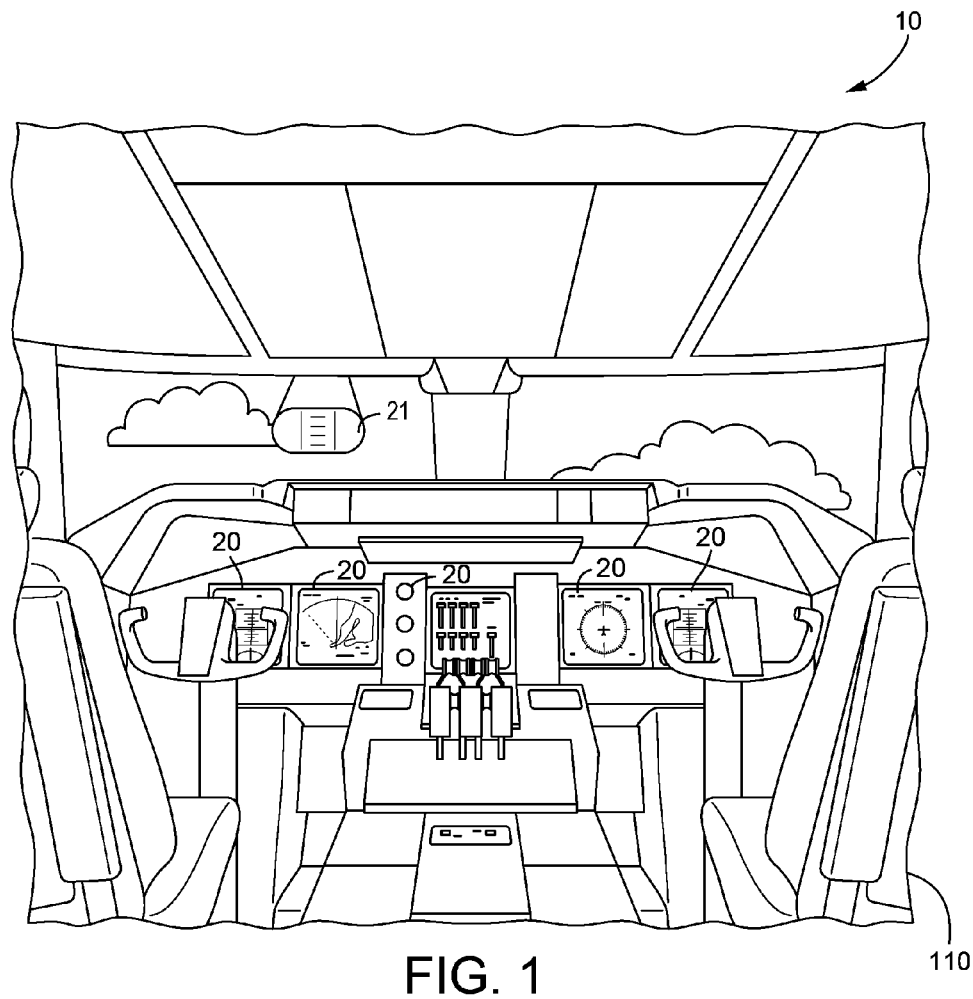
FIG. 1 is a schematic perspective view illustration of an aircraft control center or cockpit, according to an exemplary embodiment.

Before describing in detail the particular improved system and method, it should be observed that the invention includes, but is not limited to a novel structural combination of sensors, conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to one embodiment, a method of using data from at least two absolute navigation systems and at least one relative navigation system to produce a high integrity navigation solution is shown that maintains accuracy with the presence of hazardously misleading data from any one of the navigation systems or with loss of data from both absolute navigation systems. The method can include integrating the data output of the absolute and relative navigation systems to correct the error in the relative system data output by estimating the error in the relative navigation system when the absolute navigation systems' data outputs are available, all have estimated accuracy within a given performance limit and all agree within a given performance limit; and correcting the relative navigation error using this estimate to produce a corrected relative navigation output. The method can also include comparing the data outputs of the absolute navigation systems and the corrected relative navigation output data from the integration function, such that if the absolute navigation system data outputs are available and agree within the largest of the estimated error output from the left and right absolute navigation systems, then one of the absolute solutions is output. The method can also include comparing the data outputs of the absolute navigation systems and the corrected relative navigation output data from the integration function, such that if the absolute navigation system data outputs are available and do not agree within their predicted accuracy limits then the absolute navigation solution closest to the corrected relative navigation output is output. The method can also include comparing the data outputs of the absolute navigation systems and the corrected relative navigation output data from the integration function, such that if the absolute navigation system data outputs are not available then the corrected relative navigation output is output from the comparator.

In another embodiment, the method includes determining the given performance limit used in the integrator by estimating the current accuracy of the corrected relative navigation output of the integration function based on the time of, and accuracy of, the last update to the estimated error in the relative navigation system and based on the expected worst-case rate of change in the error of the relative navigation system.

In another embodiment, the method includes performing a left side and a right side comparison of the data outputs of the absolute navigation systems and the corrected relative navigation output data from the integration function, such that if the absolute navigation system data outputs are available and agree within the largest of the estimated errors output from the left and right absolute navigation systems, then the left side comparison outputs the left absolute navigation system data output and the right comparison outputs the right side absolute navigation system output.

In another embodiment, the method includes utilizing the integration function to provide corrections to the relative navigation system to allow it to estimate sensor errors and reduce drift. The method includes integrating the data output of the absolute and relative navigation systems by transmitting a navigation correction to the relative navigation system whenever the absolute navigation systems data outputs are available and have an estimated accuracy within a given performance limit and agree within a given performance limit, and providing an error estimate for this navigation correction based on the worst of the absolute navigation systems' accuracies. The method may also include using the output of the relative navigation system as the corrected relative navigation output of the integration function.

In another embodiment, the method includes feeding Doppler ground speed measurements to the integration function. The method includes updating an estimate of the errors in the Doppler measurement system using data from the absolute navigation systems whenever the absolute navigation systems' data outputs are available, and have estimated accuracy and agree within a given performance limit. The method can also include providing corrected Doppler ground speed measurements to the relative navigation system if the absolute navigation system output is unavailable or if they do not agree to or have output error estimates above a given performance limit.

Referring to FIG. 1, an illustration of an aircraft control center or cockpit 10 for an aircraft 110 is shown, according to one exemplary embodiment. Aircraft control center 10 includes flight displays 20 which are used to increase visual range and to enhance decision-making abilities. In an exemplary embodiment, flight displays 20 may provide an output from a flight management computer, flight management system, an IRS, an altitude heading reference system (AHRS), global positioning system (GPS) navigation system, aircraft sensor system, or other location or navigation device that can use drift angle, heading angle, track angle or ground speed parameters. The display system for center 10 may include a head-up display system 21.

In a preferred embodiment, aircraft control center 10 can use drift angle and/or ground speed calculated according to the advantageous processes described below. The aircraft control center 10 may use a high-integrity navigation solution output from the comparator to display an accurate position to the pilot.

Figure 2:
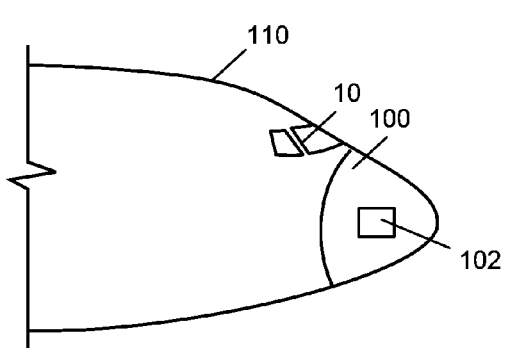
FIG. 2 is a schematic side view illustration of a front of an aircraft with an aircraft control center and nose, according to an exemplary embodiment.

In FIG. 2, the front of aircraft 110 is shown with aircraft control center 10 and nose 100, according to an exemplary embodiment. A Doppler measurement system 102 such as a weather radar or other radar system or Doppler-based navigation system is generally located inside nose 100 of the aircraft or inside a cockpit of the aircraft. According to other exemplary embodiments, Doppler measurement system 102 may be located on the top of the aircraft or on the tail of the aircraft. Doppler measurement system 102 may include or be coupled to an antenna system.

Figure 5:
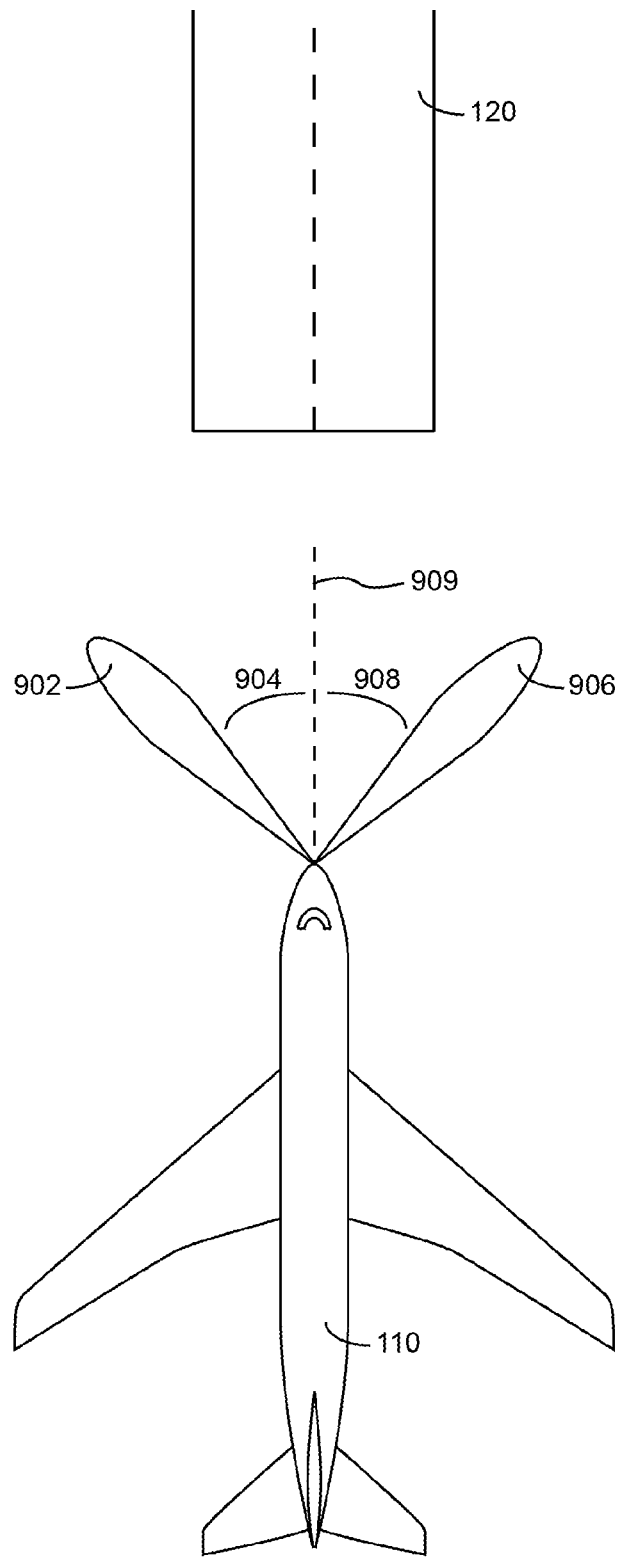
FIG. 5 is a schematic top view schematic illustration of an aircraft using the methods illustrated in FIGS. 3-4 during approach to a runway.

With reference to FIG. 5, a Doppler measurement system 102 on board the aircraft such as a weather radar or other radar system or Doppler-based navigation system system provides a first radar signal, scan or beam 902 at a first angle 904 and a second radar signal, scan or beam 906 at a second angle 908. Both signals can be processed for Doppler information. The Doppler information at the two different angles determine a drift angle and a ground speed parameter or value. Preferably, angles 904 and 908 can be any angles with respect to a center axis or longitudinal axis 909 of aircraft 110. According to one embodiment, the scans are provided on each side of aircraft 110; according to other embodiments, the scans may not be provided on each side of aircraft 110. Signals 902 and 904 reflect on the Earth's surface and are received as returns by Doppler measurement system 102. The Doppler shift imparted on these returns may be used to estimate the aircraft velocity in the direction of scans 902 and 906. This data may be provided to other systems on the aircraft as Doppler ground speed measurements. Signals 902 and 906 can be incorporated into other weather radar scans associated with Doppler measurement system 102, such as scans used during approach (e.g., windshear scans). Signals 902 and 906 may be part of a single horizontal scan. According to an exemplary embodiment, two signals at different angles may be used. The number of signals and types of scans are exemplary and do not limit the scope of the invention.

In a preferred embodiment, angles 904 and 908 are each at an azimuth angle of 45 degrees from a central axis of aircraft 110 and directed toward the Earth's surface. Radar signals 902 and 906 are provided at different azimuth angles and are scans that are directed toward the Earth's surface. Many different angles and numbers of radar signals can be utilized without departing from the scope of the invention. In a preferred embodiment, ground speed and drift angle are calculated from Doppler parameters to a usable accuracy in the direction of scan.

Figure 3:
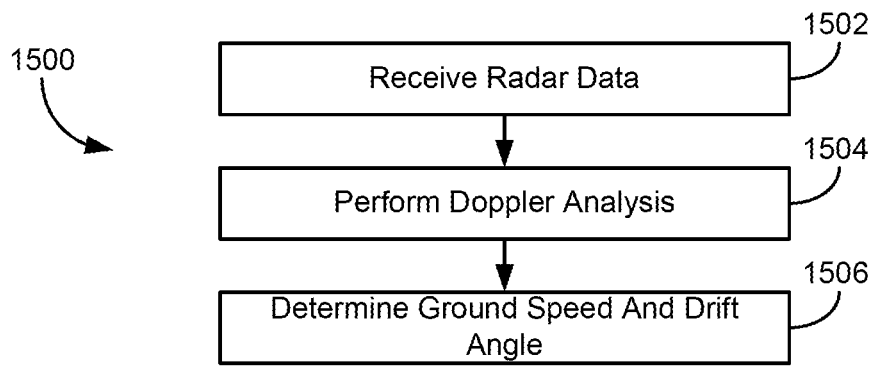
FIG. 3 is a process flow diagram of a method for determining drift angle and ground speed parameters, according to an exemplary embodiment.

With reference to FIG. 3, a method 1500 uses Doppler measurement system 102. At a step 1502, system 102 provides radar signals and receives radar returns or return data. At a step 1504, system 102 performs Doppler analysis on the received radar data, (e.g., weather radar return data). The Doppler analysis is used to determine a ground speed and a drift angle parameter at a step 1506. As discussed above, a ground speed parameter and drift angle parameter can be expressed, stored and communicated as a vector or data. The ground speed parameter and drift angle parameter can be used to calculate other information, such as, heading angle, track angle, location, etc.

The Doppler parameters can be calculated in a Doppler augmentation or Doppler navigator technique. The Doppler navigator technique can determine velocity of aircraft 110 along the ground. Changes in frequency associated with each radar return are used to determine velocity in the direction of the scan in accordance with Doppler theory. In a preferred embodiment, the relative speed in each direction of scan is used to mathematically compute the drift angle and ground speed of aircraft 110. Generally, radar measurements use relative speed with respect to the Earth's surface with respect to the aircraft's own axis. This relative velocity vector can be expressed as a ground speed and a drift angle. To convert the relative ground velocity into an absolute ground velocity an absolute axis reference is needed for the aircraft's own axis. This absolute axis reference can be the true or magnetic heading angle 909 of aircraft 110.

Although only two radar signals 902 and 906 are shown in FIG. 5, various numbers of signals can be utilized. In particular, method 1500 can utilize three or more signals. In a preferred embodiment, radar signal 902 is provided to a left side of the flight path of aircraft 110, and radar signal 906 is provided to a right side of the flight path of aircraft 110. Doppler measurement system 102 can obtain very accurate measurements of aircraft ground speed in the direction of scan by using Doppler parameters. Doppler measurement system 102 can utilize this information to provide an accurate velocity vector for use in a dead-reckoning or coasting algorithm after GPS fails.

Figure 4:
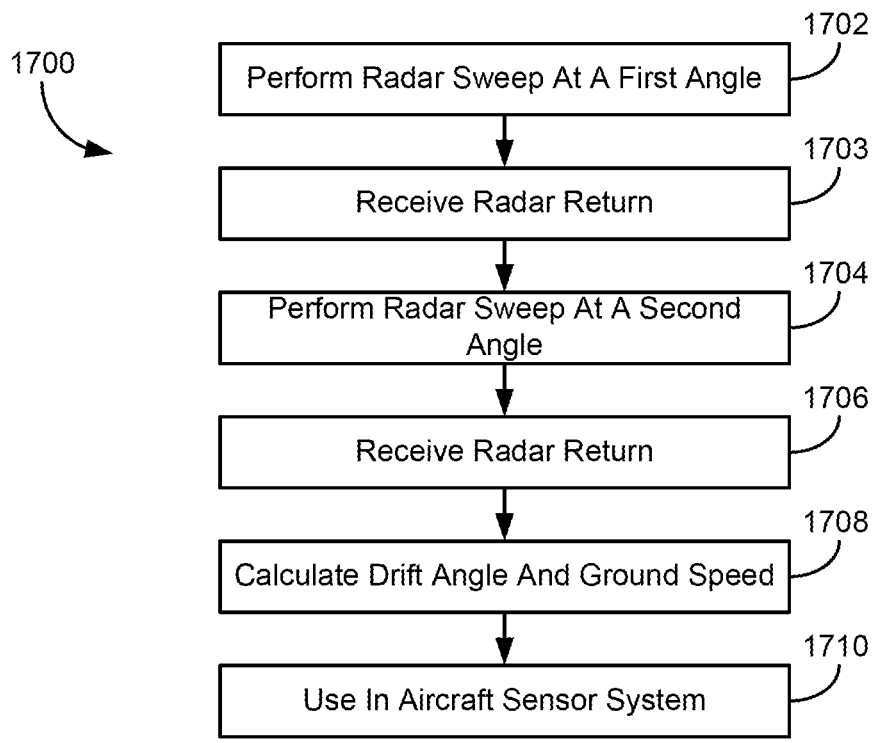
FIG. 4 is a process flow diagram of a method of determining and using drift angle and ground speed parameters, according to a further exemplary embodiment.

Referring now to process 1700 of FIG. 4, at a step 1702, a first radar sweep at a first angle is performed to determine a drift angle parameter and ground speed parameter. At a step 1703, a first radar return from the first radar sweep is received. At a step 1704, a second radar sweep at a second angle is performed.

At a step 1706, a second radar return associated with a second sweep is received. At a step 1708, drift angle and ground speed are determined using Doppler measurements. The drift angle together with a heading angle from another sensor can be used to determine track angle. Track angle and ground speed can be used in a dead-reckoning algorithm to estimate the ground track and current position from where the position was last measured.

At step 1708, the velocity on the left side of aircraft 110 and the right side of aircraft 110 is determined using the Doppler information from the radar returns and both relative speeds are determined in order to determine drift angle and ground speed. Drift angle and ground speed can be determined in system 102. Alternatively, Doppler measurement system 102 can utilize the radar return data or velocity indicative data derived from the radar return data and determine the ground speed and drift angle parameter. At a step 1710, drift angle and ground speed parameters or data are utilized in an aircraft sensor system such as system 102.

Figure 6:
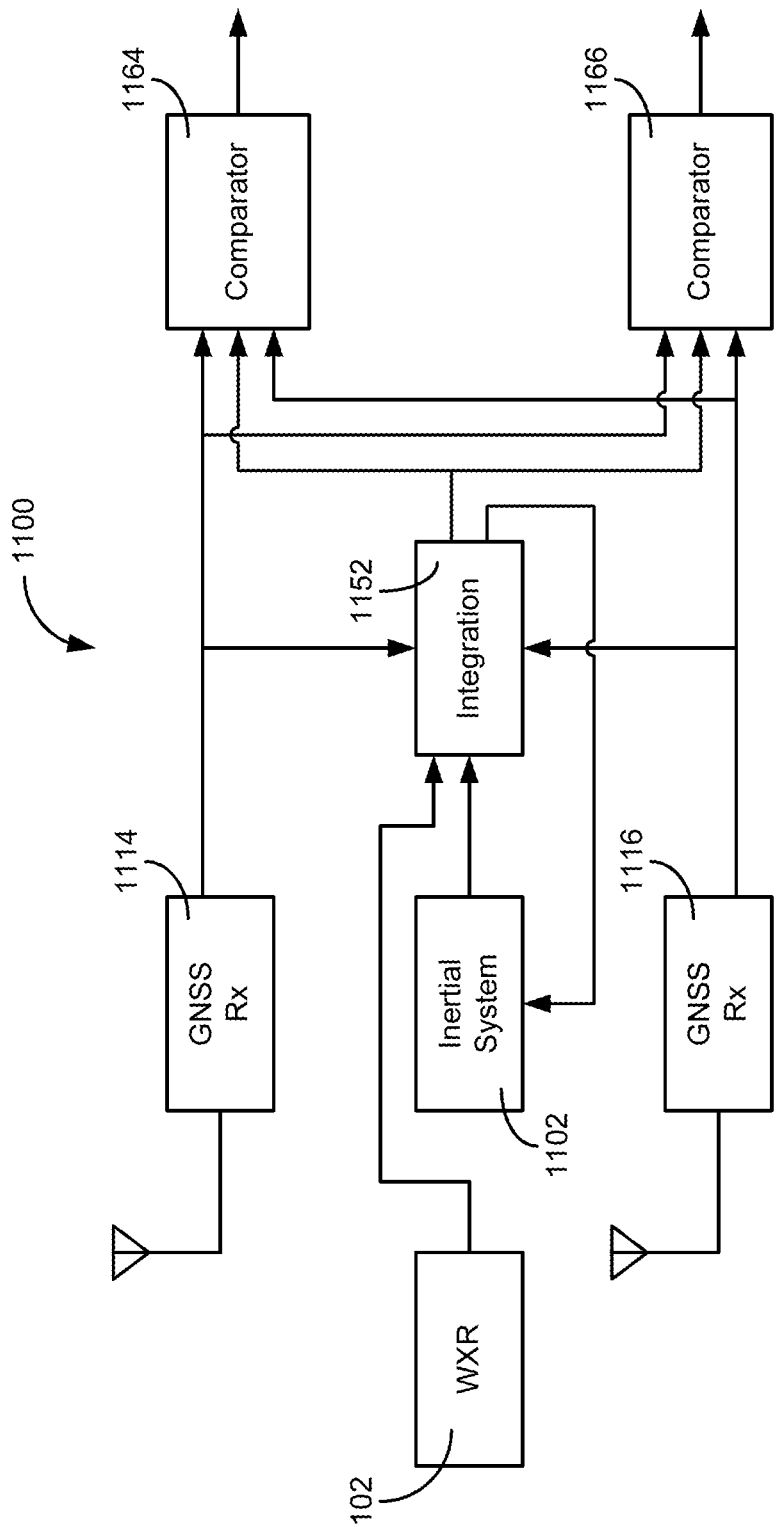
FIG. 6 is a general block diagram of an aircraft navigation voting system including two GNSS absolute navigation systems, an inertial system relative navigation system, an integration function, a left and right comparator, and a weather radar (WXR) based Doppler measurement system, according to an another exemplary embodiment.

With reference to FIG. 6, a high integrity navigation system 1100 includes a first absolute navigation system here illustrated as a GNSS receiver (Rx) 1114, a second absolute navigation system here illustrated as a second GNSS receiver 1116, a relative navigation system here illustrated as an inertial system 1102, an integration unit 1152, a comparator unit 1164 and a second comparator unit 1166. Comparator units 1164 and 1166 can be comprised of voting units for providing a selectable navigation parameter. Doppler ground speed measurements may be provided to integration function 1152 by a Doppler measurement system 102 illustrated herein as a weather radar system (WXR) in accordance with an exemplary embodiment.

Absolute navigation systems 1114, 1116 provide navigation information such as position, velocity and estimated accuracy to the comparators 1164, 1166 and integration function 1152. Absolute navigation systems 1114, 1116 are a position source which provides output data that includes or is related to position. Herein the terms absolute navigation system and absolute position source may be used interchangeably to indicate a data source that provides at least a position or position-related output. Absolute navigation systems 1114, 1116 may be dissimilar systems or similar systems such as two GPS receivers. If absolute navigation systems 1114, 1116 are similar they will contain autonomous integrity monitoring systems that can detect and exclude any single significant navigation source fault such as inaccurate or erroneous data from any single satellite. Absolute navigation systems 1114, 1116 will typically provide navigation accuracy estimates such that if the two absolute navigation systems 1114, 1116 outputs are compared they will with high probability be within limits derived from these accuracy estimates. In general if the two absolute navigation systems 1114, 1116 outputs differ by more than the derived limits it is an indication of a fault or erroneous behavior from one of the two absolute navigation systems 1114, 1116.

Relative navigation function 1102 provides navigation data output such as position, velocity and estimated accuracy to the integration function 1152. Relative navigation function 1102 is associated with a position source which provides output data that includes or is related to position. Herein the terms relative navigation system and relative position source may be used interchangeably to indicate a data source that provides at least a position or position-related output. Relative navigation function 1102 may be implemented as an inertial system. This inertial system may be implemented utilizing expensive high-performance inertial sensors such as navigation-grade ring laser gyros and precision accelerometers, or with lower-cost, lower-performance Micro-Electro-Mechanical Systems (MEMS) gyros and accelerometers. The MEMS-based inertial systems typically offer significant cost, size, weight and power advantages over high-performance inertial sensors, but they do not offer the same level of long-term stability. To maintain accurate position and velocity estimates these systems often employ Kalman filter based error correction systems that utilize externally provided position and/or velocity to allow inertial relative navigation system 1102 to estimate the errors of its internal sensors and correct its outputs. The precision inertial relative navigation system 1102 utilizing high-performance inertial sensors may also utilize the above Kalman filter correction techniques but in general they can maintain accurate navigation for much longer after loss of all externally provided position and/or velocity.

When the output navigation data from absolute navigation systems 1114,1116 are available and the output estimated accuracy of both systems are within a given performance limit and the navigation outputs of the two absolute navigation systems 1114,1116 agree within a given performance limit, integration function 1152 considers the absolute navigation systems 1114,1116 outputs valid and may utilize the absolute navigation systems 1114,1116 outputs to update the navigation correction information that is used by the relative inertial system 1102. In some embodiments, the navigation correction information may be represented by the corrections to minimize the long-term drift of the relative navigation system. Additionally, if integration function 1152 considers the absolute navigation systems 1114,1116 outputs valid, and valid output is available from a Doppler measurement system 102, the integration function may update navigation correction information that is used by the relative inertial system 1102. In some embodiments, the navigation correction information may be represented by error estimates of the Doppler measurement system 102. If integration function 1152 does not consider the absolute navigation systems 1114,1116 outputs valid, the navigation correction information is not updated. If integration function 1152 does not consider the absolute navigation systems 1114,1116 outputs valid, and valid output from Doppler measurement system 102 is available, the output from Doppler measurement system 102 will typically still be corrected based on the last updated navigation correction information that is related to Doppler measurement system 102. Relative navigation function 1102 can use the navigation correction information to correct for navigation system errors. Integration function 1152 may forward the relative navigation system 1102 output as the corrected relative navigation output to comparators 1164, 1166.

Comparator functions 1164, 1166 provide high integrity navigation information to the other systems on board the aircraft. The high integrity navigation information may include position, velocity, and an estimate of navigational accuracy, as well as other parameters. When the output navigation data from absolute navigation systems 1114,1116 are available and the output estimated accuracy of both systems are within a given comparator performance limit and the navigation outputs of the two absolute navigation systems 1114,1116 agree within the largest of the estimated accuracy bounds output by absolute navigation systems 1114,1116, comparator functions 1164, 1166 consider the absolute navigation systems 1114,1116 outputs valid. If first comparator 1164 considers the absolute navigation systems 1114,1116 outputs valid it will output the first absolute navigation system 1114 output as the high integrity first comparator 1164 output and will transmit the largest of the estimated accuracy bounds output by absolute navigation systems 1114,1116 as the first comparator 1164 accuracy bound. If second comparator 1166 considers the absolute navigation systems 1114, 1116 outputs valid it will output the second absolute navigation system 1116 output as the high integrity second comparator 1166 output and will transmit the largest of the estimated accuracy bounds output by absolute navigation systems 1114,1116 as the second comparator 1166 accuracy bound. If either comparator 1164, 1166 does not consider the absolute navigation systems 1114,1116 outputs valid, then that comparator 1164 and/or 1166 it will output the corrected relative navigation output from the integration function 1152.

Doppler measurement system 102 can be any electronic radar platform with Doppler sensing capabilities utilized. Doppler measurement system 102 preferably is a Rockwell Collins Multi-Scan™ weather radar system, commercially available from Rockwell Collins, Inc. of Cedar Rapids, Iowa. A radar system manufactured by Honeywell, Inc. can also be configured as described herein to provide drift angle and ground speed parameters without departing from the scope of the invention. Multiple fixed radar beacons or other Doppler measurement devices may also be used for Doppler measurement system 102, but at an added size weight power and cost over utilizing a weather radar that may already be required on the aircraft for other purposes.

For clarity of the description, the high integrity navigation system 1100 in FIG. 6 is illustrated as functional blocks. This should in no way imply a restriction or limitation in the physical implementation of the invention. Functional blocks may be combined, split, or replicated as necessary to facilitate efficient packaging and meet requirements of functional partitioning. For example integration function 1152 may be combined with relative navigation system 1102 in a single Line Replaceable Unit (LRU), or integration function 1152 may be replicated and packaged as two instances with first comparator 1164 and second comparator 1166.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps, in whole or in part, in various equipment or according to any of a variety of mathematical formulas without departing from the invention. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A method of estimating position for an aircraft, the method comprising:
    receiving first position data and first accuracy data from a first absolute position source;
    receiving second position data and second accuracy data from a second absolute position source;
    receiving relative position source data from at least one relative position source, the relative position source data being provided using correction data;
    using the first position data and the second position data to update the correction data when the first position data and the second position data are within performance limits determined using the first accuracy data and the second accuracy data; and
    providing the first position data at a first output when the first position data is within an accuracy of the second position data and providing the second position data at a second output when the second position data is within an accuracy of the first position data and providing the relative position source data to the first output, the second output or both the first output and the second output when either the first position data is not within the accuracy of the second position data or the second position data is not within the accuracy of the first position data.

2. The method of claim 1 wherein ground speed measurements from a Doppler measurement system are utilized to correct errors in a relative navigation system solution used to provide the relative position source data.

3. The method of claim 2 wherein ground speed measurements from a radar system are utilized.

4. The method of claim 1 wherein navigation correction information is transmitted to the relative position source system to reduce errors.

5. The method of claim 1, wherein the relative position source is an inertial navigation system.

6. The method of claim 1, wherein the relative position source is an attitude and heading reference system.

7. The method of claim 1, wherein the absolute position sources are a first and second GPS system.

8. The method of claim 1, wherein a position estimate is available and accurate after a failure of any one absolute position source, and wherein a high integrity position estimate is available and accurate after a failure of the relative position source, and wherein the high integrity position estimate is available and accurate after loss of all absolute position sources.

9. The method of claim 8, wherein ground speed measurements from a Doppler measurement system are utilized to correct errors in the position estimate.

10. The method of claim 8, wherein drift angle measurement from a Doppler measurement system are utilized to correct errors in the position estimate.

11. A high integrity navigation system comprising:
    at least two absolute navigation systems;
    at least one relative navigation system;
    at least one integration function unit; and
    at least one comparator function unit;
    wherein the integration function unit provides correction to long-term drift of the relative navigation system; and wherein comparator unit is configured to compare outputs of the at least two absolute navigation systems with the corrected relative navigation system data and generate a high integrity navigation solution, wherein the high integrity navigation solution provides a first position data at a first output from one of the two absolute navigation systems when the first position data is within an accuracy of second position data from another of the two absolute navigation systems and provides the second position data at a second output when the second position data is within an accuracy of the first position data and provides relative position source data from the relative navigation solution to the first output, the second output or both the first output and the second output when either the first position data is not within the accuracy of the second position data or the second position data is not within the accuracy of the first position data, wherein the relative position source data is provided using correction data, wherein the first position data and the second position data are used to update the correction data when the first position data and the second position data are within performance limits determined using first accuracy data associated with the first position and second accuracy data associated with the second position.

12. The high integrity navigation system of claim 11, wherein ground speed measurements from a Doppler measurement system are utilized to correct errors in the relative position source data.

13. The high integrity navigation system of claim 11, wherein ground speed measurements from a Doppler measurement system are utilized by the integration function unit to correct errors in the relative position source data.

14. The high integrity navigation system of claim 11, wherein navigation correction information is transmitted to the relative navigation system by an integration function to reduce errors in the relative position source data.

15. The high integrity system of claim 11, wherein a position estimate is available and accurate after a failure of any one absolute navigation system, and wherein a position estimate is available and accurate after a failure of the relative navigation system, and wherein a position estimate is available and accurate after a loss of all absolute navigation systems.

16. A high integrity navigation system for use in aircraft and other vehicles requiring enhanced navigation performance and integrity, the high integrity navigation system comprising:
an integration unit configured to receive first and second position data from two absolute navigation systems and relative position data from a relative navigation system, the integration unit configured to receive the relative position data of the relative navigation system with the first and second position data of the two absolute navigation systems to provide high integrity corrections for the relative navigation system when the first position data and the second position data are within performance limits so that the relative navigation system provides an accurate, high-integrity navigation data output comprising the relative position source data; and
a unit configured to compare the first and second position data from the two absolute navigation systems and providing the first position data at a first output from one of the two absolute navigation systems when the first position data is within an accuracy of the second position data from another of the two absolute navigation systems and providing the second position data at a second output when the second position data is within an accuracy of the first position data and providing the relative position source data to the first output, the second output or both the first output and the second output when either the first position data is not within the accuracy of the second position data or the second position data is not within the accuracy of the first position data.

17. The system of claim 16, wherein the relative navigation system uses Doppler measurement system output for the accurate, high-integrity navigation data output when the absolute navigation systems are not functioning or are not within an error tolerance.

18. The system of claim 16, wherein the relative navigation system is an inertial navigation system.

19. The system of claim 16, wherein the relative navigation system is an attitude and heading reference system.

20. An apparatus, comprising:
an integration function unit configured to receive first navigation data and second navigation data from at least two absolute navigation systems and relative navigation data from at least one relative navigation system, the integration unit further configured to provide corrections for errors in the third navigation data; and
an comparator function unit configured to compare the first and second navigation data from the two absolute navigation systems and provide the first navigation data at a first output from one of the two absolute navigation systems when the first navigation data is within an accuracy of the second navigation data from another of the two absolute navigation systems and providing the second navigation data at a second output when the second navigation data is within an accuracy of the first navigation data and providing the relative navigation data to the first output, the second output or both the first output and the second output when either the first navigation data is not within the accuracy of the navigation data or the second navigation data is not within the accuracy of the first navigation data.

* * * * *

UNITED STATES PATENT AND TRADEMARK OFFICE
CERTIFICATE OF CORRECTION

PATENT NO.         : 8,909,471 B1                                    Page 1 of 1
APPLICATION NO.    : 13/250307
DATED              : December 9, 2014
INVENTOR(S)        : Richard D. Jinkins et al.

It is certified that error appears in the above-identified patent and that said Letters Patent is hereby corrected as shown below:

In the Claims

Column 10:
    Lines 18 and 19, claim 4, delete "sys-tem"
    Line 46, claim 11, insert -- the -- before "comparator"
    Line 46, claim 11, insert -- function -- before "unit"
    Line 48, claim 11, delete "the"
    Line 57, claim 11, delete "from the" and insert -- from a --

Column 11:
    Line 29, claim 16, insert -- source -- before "data"
    Line 31, claim 16, insert -- source -- before "data"

Column 12:
    Line 23, claim 20, insert -- source -- before "data"
    Line 26, claim 20, delete "third navigation" and insert -- relative navigation source --
    Line 27, claim 20, delete "an" and insert -- a --
    Line 36, claim 20, insert -- source -- before "data to the"
    Line 39, claim 20, insert -- second -- before "navigation"

Signed and Sealed this
Twenty-fourth Day of March, 2015

Michelle K. Lee
*Director of the United States Patent and Trademark Office*